United States Patent
Li et al.

(10) Patent No.: US 11,133,628 B2
(45) Date of Patent: Sep. 28, 2021

(54) POWER STRIP WITH DEVICE INFORMATION INPUT AND DISPLAY CAPABILITIES

(71) Applicant: BOE TECHNOLOGY GROUP CO., LTD., Beijing (CN)

(72) Inventors: Yanfu Li, Beijing (CN); Xiangdong Yang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 571 days.

(21) Appl. No.: 16/080,988

(22) PCT Filed: Feb. 13, 2018

(86) PCT No.: PCT/CN2018/076652
§ 371 (c)(1),
(2) Date: Aug. 29, 2018

(87) PCT Pub. No.: WO2018/233310
PCT Pub. Date: Dec. 27, 2018

(65) Prior Publication Data
US 2021/0184409 A1    Jun. 17, 2021

(30) Foreign Application Priority Data
Jun. 23, 2017    (CN) .......................... 201710483581.2

(51) Int. Cl.
*H01R 13/70*    (2006.01)
*H01R 25/00*    (2006.01)
(Continued)

(52) U.S. Cl.
CPC ....... *H01R 25/006* (2013.01); *H01R 13/6683* (2013.01); *H01R 13/70* (2013.01);
(Continued)

(58) Field of Classification Search
CPC .. H01R 25/006; H01R 13/6683; H01R 13/70; H01R 13/7175; H01R 25/003; G06F 3/04817; G06F 3/0488
See application file for complete search history.

(56) References Cited

U.S. PATENT DOCUMENTS 6,095,850 A * 8/2000 Liu ........................ G01R 13/02
439/488
7,772,717 B2 * 8/2010 Kitamura ............. H01R 25/006
307/38
(Continued)

FOREIGN PATENT DOCUMENTS

CN    1233866 A    11/1999
CN    2930002 Y    8/2007
(Continued)

OTHER PUBLICATIONS

China First Office Action, Application No. 201710483581.2, dated Apr. 23, 2019, 19 pps.: with English translation.
(Continued)

*Primary Examiner* — Tho D Ta
(74) *Attorney, Agent, or Firm* — Armstrong Teasdale LLP (57) ABSTRACT

Embodiments of the present disclosure provide a power strip, including at least one socket, and a display unit configured to display information of a device plugged into the at least one socket. Through the display unit, the information of the device corresponding to the socket can be conveniently provided, preventing operating incorrectly.

17 Claims, 5 Drawing Sheets

(51) Int. Cl.
*H01R 13/66* (2006.01)
*H01R 13/717* (2006.01)
*G06F 3/0481* (2013.01)
*G06F 3/0488* (2013.01)

(52) U.S. Cl.
CPC ....... *H01R 13/7175* (2013.01); *G06F 3/0488* (2013.01); *G06F 3/04817* (2013.01)

(56) References Cited

U.S. PATENT DOCUMENTS

| | | | |
|---|---|---|---|
| 7,980,888 B1* | 7/2011 | Fukushima | H01R 29/00 439/489 |
| 9,389,769 B1* | 7/2016 | O'Keeffe | G02B 6/0078 |
| 2009/0251127 A1* | 10/2009 | Kim | G01R 22/063 324/76.11 |
| 2009/0261661 A1* | 10/2009 | Finneran | H02J 9/005 307/141.8 |
| 2011/0043034 A1* | 2/2011 | Pien | H02J 3/14 307/38 |
| 2012/0049639 A1* | 3/2012 | Besore | G01K 3/005 307/97 |
| 2013/0338844 A1 | 12/2013 | Chan et al. | |
| 2014/0099821 A1* | 4/2014 | Shammoh | H01R 25/006 439/535 |
| 2016/0225246 A1* | 8/2016 | Huang | H01R 25/006 |
| 2017/0070090 A1* | 3/2017 | Miller | H01R 13/6683 |
| 2017/0102907 A1* | 4/2017 | Kuo | G06F 1/26 |
| 2017/0193793 A1* | 7/2017 | Ricciuti | G08B 21/182 |
| 2018/0358767 A1* | 12/2018 | Brower | H01R 12/7082 |
| 2019/0013766 A1* | 1/2019 | Stach | H02J 7/35 |

FOREIGN PATENT DOCUMENTS

| | | |
|---|---|---|
| CN | 101740954 A | 6/2010 |
| CN | 202740731 U | 2/2013 |
| CN | 203039155 U | 7/2013 |
| CN | 203677897 U | 7/2014 |
| CN | 104022407 A | 9/2014 |
| CN | 204481262 U | 7/2015 |
| CN | 104868326 A | 8/2015 |
| CN | 104917002 A | 9/2015 |
| CN | 105467874 A | 4/2016 |
| EP | 3174251 A1 | 5/2017 |
| JP | 2005080455 A | 3/2005 |
| JP | 2006196324 A | 7/2006 |
| JP | 2007299624 A | 11/2007 |
| WO | 2016025998 A1 | 2/2016 |

OTHER PUBLICATIONS

China Third Office Action, Application No. 201710483581.2, dated Dec. 13, 2019, 20 pps.: with English translation.
PCT International Search Report, Application No. PCT/CN2018/076652, dated May 8, 2018, 6 pages: with English translation.
PCT Written Opinion, Application No. PCT/CN2018/076652, dated May 8, 2018, 5 pages.: with English translation of relevant part.
European Extended Search Report, Application No. 18755389.6, dated Feb. 4, 2021, 8 pps.

* cited by examiner

| Power strip model/ID | XXX/XXX |
|---|---|
| Socket | Device Information | Switch state |
| Red | 55"3D Medical | ON |
| Green | iGallery | ON |
| Blue | Other device | ON |
| Yellow | Astro Player | ON |
| Power strip |||

POWER STRIP WITH DEVICE INFORMATION INPUT AND DISPLAY CAPABILITIES

CROSS REFERENCE TO RELATED APPLICATIONS

This patent application is a National Stage Entry of PCT/CN2018/076652 filed on Feb. 13, 2018, which claims the benefit and priority of Chinese Patent Application No. 201710483581.2 filed on Jun. 23, 2017, the disclosures of which are incorporated herein by reference in their entirety as part of the present application.

BACKGROUND

The present disclosure relates to a power strip.

One or more sockets on a power strip are used to supply power to devices. In the case of a large number of devices, for example, in a work site such as a laboratory, long power cables easily cross with each other. As the color and shape of power cables are substantially the same, it is difficult to distinguish the corresponding relationship between sockets and devices. Therefore, in order to remove a device from a socket, instead of directly pulling out a power cable, it is necessary to firstly find the corresponding plug along the power cable starting from the device end, and then remove it. This process can easily affect other devices, and is not conducive to the safety of the user.

There is room for improvement in the power strip.

BRIEF DESCRIPTION

Embodiments of the present disclosure provide a power strip.

The embodiments of the present disclosure provide a power strip including at least one socket, and a display unit configured to display information of a device plugged into the at least one socket.

In embodiments of the disclosure, the information includes at least one of a type of the device, a specification of the device, a location of the device, or a state of the device.

In embodiments of the disclosure, the display unit includes at least one display screen, and the at least one display screen corresponds to the at least one socket.

In embodiments of the disclosure, the display unit includes a display screen.

In embodiments of the disclosure, the power strip further includes at least one identification component configured to identify the at least one socket.

In embodiments of the disclosure, the at least one identification component identifies the at least one socket by means of at least one of a color, a text, or a shape.

In embodiments of the disclosure, the at least one identification component includes an indicator light.

In embodiments of the present disclosure, the power strip further includes an information acquisition circuit coupled to the display unit and configured to acquire information of the device.

In embodiments of the disclosure, the information acquisition circuit includes a communication circuit configured to communicate with a user terminal so as to acquire information of the device from the user terminal.

In embodiments of the disclosure, the communication circuit includes a wireless network communication module.

In embodiments of the disclosure, the power strip further includes at least one switch circuit configured to control an electrical connection between the at least one socket and a power input terminal of the power strip.

In embodiments of the disclosure, the at least one switch circuit is configured to be turned on or off under the control of the user terminal.

In embodiments of the disclosure, the information acquisition circuit includes a detection circuit configured to detect information of the device.

In embodiments of the disclosure, the detection circuit includes a device connection state detection circuit configured to detect whether the device is plugged into the at least one socket.

In embodiments of the disclosure, the device connection state detection circuit includes a piezoelectric sensor.

In embodiments of the disclosure, the detection circuit includes a device electrical parameter detection circuit and a memory, wherein the device electrical parameter detection circuit is configured to detect electrical parameters of the device, and the memory is configured to store a corresponding relationship between the electrical parameters of the device and the information of the device.

In embodiments of the disclosure, the device electrical parameter detection circuit includes at least one of a voltage sensor or a current sensor.

In embodiments of the present disclosure, the power strip further includes a display control circuit configured to control the display unit to display the connection state of the device, and in response to that the device connection state detection circuit detects that the device is removed from the at least one socket, control the display unit to stop displaying information of the device.

In embodiments of the disclosure, the information acquisition circuit includes an information input circuit configured to input information of the device plugged into the at least one socket.

In embodiments of the disclosure, the information input circuit includes at least one of a button or a touch screen.

BRIEF DESCRIPTION OF THE DRAWINGS

In order to illustrate the technical solutions of the embodiments of the present disclosure more clearly, the drawings of the embodiments will be briefly described below, and it should be appreciated that the drawings described below are only related to some of the embodiments of the present disclosure, rather than limiting the present disclosure, in which.

DETAILED DESCRIPTION

In order to make the technical solutions and advantages of the embodiments of the present disclosure clearer, the technical solutions of the embodiments of the present disclosure will be clearly and completely described below in conjunction with the accompanying drawings. Obviously, the described embodiments are part of the present disclosure, rather than all of the embodiments. Based on the described embodiments of the present disclosure, all the other embodiments obtained by those skilled in the art without the need for creative labor also belong to the scope of protection of the present disclosure.

Figure 1:
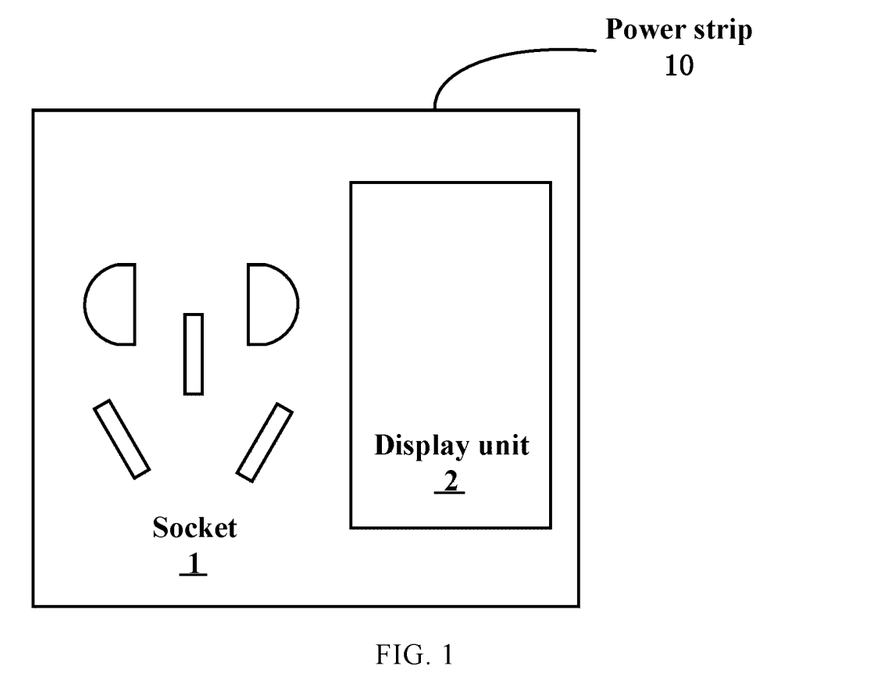
FIG. 1 is a schematic diagram of the appearance of a power strip according to embodiments of the present disclosure.

FIG. 1 is a schematic diagram of the appearance of a power strip according to embodiments of the present disclosure. As shown in FIG. 1, the power strip 10 includes at least one socket 1 and a display unit 2. The socket 1 is configured to allow a device to be pluggably plugged into. The display unit 2 is configured to display information of the device plugged into the at least one socket 1. Said displaying information of the device refers to displaying the kind of device plugged into the socket, and the information includes at least the type of the device. Further, the information may also include information such as the specification, location, or state of the device, so that the user can more clearly learn about the specific device plugged into the socket. For example, in embodiments, on the display unit 2, "coupled device: displayer", "coupled device: air conditioner", and/or "coupled device: television" may be displayed. In embodiments, for example, on the display unit 2, "coupled device: TV in living room", "coupled device: washing machine in kitchen, ON", and/or "coupled device: BenQ W1300 projector in bedroom" may be displayed.

In the above embodiments, although examples of displaying information by text are listed, it is also possible to use graphics, pictures, images, and the like. As there are common schematic icons for various common appliances such as televisions, air conditioners, washing machines, etc., in the electronic product industry, the information may also at least include the type of the device displayed in the form of an image.

In the above embodiments, although examples of displaying information in the form of text or images are listed, it is also possible to use other manners for display. For example, a number of icons corresponding to sockets may be displayed on the display unit, and the user's finger touch on an icon may trigger an audio to broadcast the information of the device plugged into the socket, and/or, the display unit may be a projection type imaging display element, which projects the information of the corresponding device plugged into the socket for example, at least the type thereof, in a holographical manner.

In the embodiments of the present disclosure, by means of the display unit 2, the information of the device plugged into the socket 1 can be conveniently provided, which can facilitate the user to remove the correct device. In the process of removing the device, other power cables will not be affected. This can better ensure the safety of both equipment and users.

Figure 2:
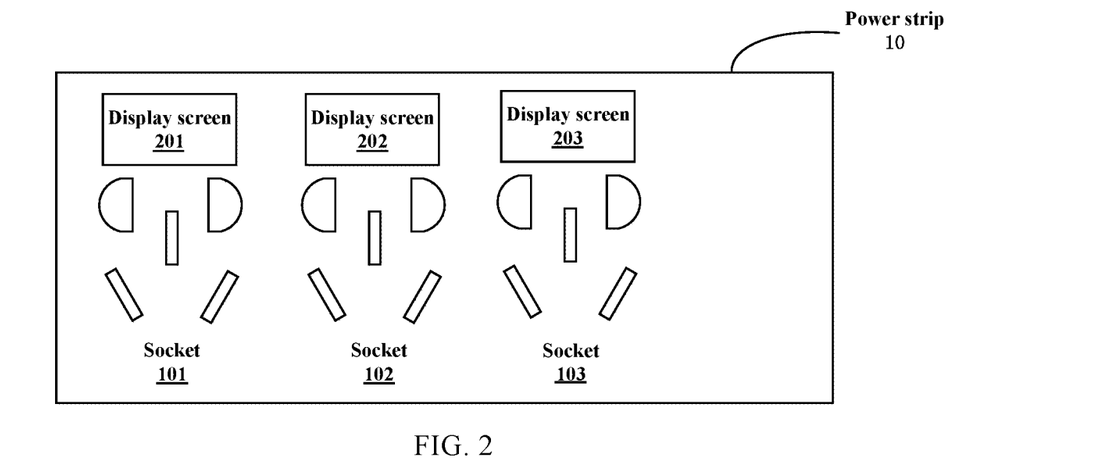
FIG. 2 is a schematic diagram of the appearance of a power strip according to embodiments of the present disclosure.

FIG. 2 is a schematic diagram of the appearance of a power strip according to embodiments of the present disclosure. As shown in FIG. 2, the display unit 2 may include a plurality of display screens, and the display screens and the sockets are provided in a one-to-one corresponding relationship. As an example, three sockets 101, 102, 103 and three corresponding display screens 201, 202, 203 are shown in FIG. 2. For example, the display screen 201 can display "displayer", the display screen 202 can display "television", and the display screen 203 can display "electric cooker."

In the embodiments of the present disclosure, the specific type of the display screen is not limited. Display schemes such as LCD, OLED, QLED, and Eink can be applied to the technical solutions of the present disclosure. The display unit 2 can include a display control circuit in any form, for example, a display screen can be controlled using a microcontroller, a digital signal processor, a programmable logic gate array, or the like.

It should be understood that when the power strip 10 includes a plurality of sockets 1, it is also possible to use only one display screen to correspond to the plurality of sockets 1, and display information of the devices corresponding to the plurality of sockets 1. The power strip 10 can also include at least one identification component for identifying the socket. The at least one identification component may identify the at least one socket by at least one of a color, a text, or a shape. As an example, the three sockets 101, 102, 103 may be set to "red", "yellow", and "blue", respectively. In this way, "red: displayer, yellow: TV, and blue: electric cooker" may be displayed on the display screen. As an example, a red LED lamp, a yellow LED lamp, and a blue LED lamp may also be provided in the vicinity of the sockets 101, 102, and 103, respectively.

In the embodiments of the present disclosure, by providing a corresponding number of display screens or corresponding display manners of a display screen according to the number of the sockets 1, the user can conveniently distinguish different sockets. In addition, the identification component not only facilitates the display of the display unit 2, but also facilitates the provision of the corresponding relationship between the socket 1 and the plug. For example, an indicator such as a label corresponding to the identification component of the socket 1 may be attached to the plug. The label of the plug corresponding to the red socket can be painted red or written with the text "red". In this way, the socket 1, the plug, and the device are coupled, and the user can perform fast and accurate operations on the field. Also, different colors can also represent different levels of importance. For example, red can represent that the device is important and cannot be removed arbitrarily.

Figure 3:
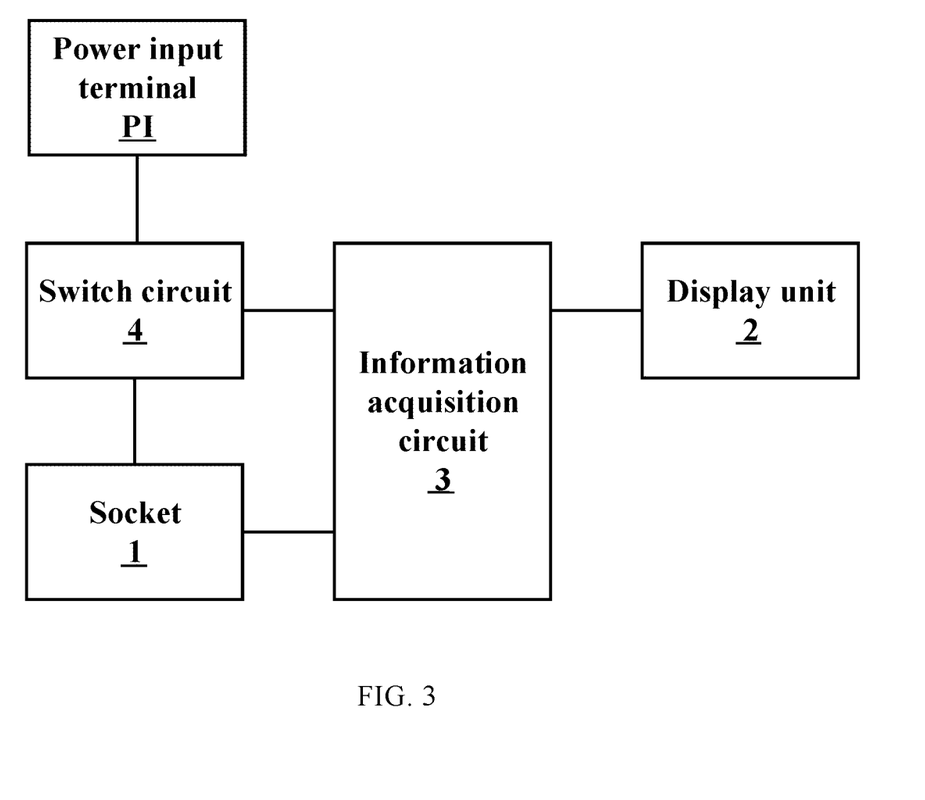
FIG. 3 is a schematic structural block diagram of a power strip according to embodiments of the present disclosure.

FIG. 3 is a schematic structural block diagram of a power strip according to embodiments of the present disclosure. As shown in FIG. 3, the power strip 10 includes a socket 1, a display unit 2, and an information acquisition circuit 3. The information acquisition unit 3 is coupled to the display unit 2 and configured to acquire information of the device. This information will be transmitted to the display unit 2 for display.

As shown in FIG. 3, the power strip 10 further includes a switch circuit 4 configured to control the electrical connection between the socket 1 and the power input terminal PI of the power strip 10. The switch circuit 4 is configured to control the supply of power to the socket 1 so that the device can be powered off without pulling out the plug of the device. The switch circuit 4 can include an electronic switch that is turned on or off by receiving an instruction from a communication circuit. Correspondingly, the user terminal acting as a power strip control device is further configured to set the state of the switch circuit 4 to be turned on or off.

Figure 4:
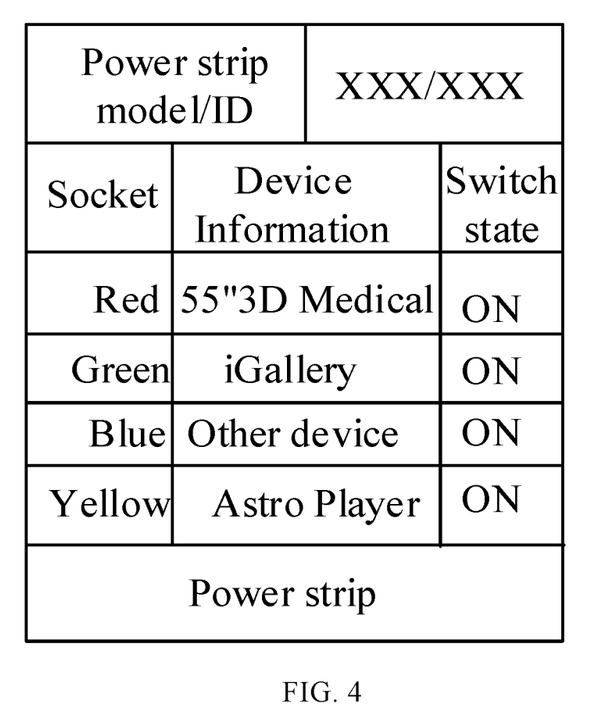
FIG. 4 is a schematic diagram of a control interface of a power strip control device for controlling a power strip according to embodiments of the present disclosure.

FIG. 4 is a schematic diagram of a control interface of a power strip control device for controlling a power strip according to embodiments of the present disclosure. The user can set the state of the switch circuit 4 through the power strip control device. The information acquisition circuit 3 can also be configured to be coupled to the switch circuit 4 to acquire the state of the switch circuit 4. The state of the switch circuit 4 can also be displayed by the display unit 2. For example, the user can input information of the device plugged into the socket 1 and information on the state of the switch circuit 4 through the power strip control device. For example, the information may include "red: 55" 3D medical (display screen), ON, green: iGallery, ON, blue: other device, ON, and yellow: Astro player, ON."

The model and identity information of the power strip may also be displayed on the power strip control device. That is, the same power strip control device can be coupled to multiple different power strips of multiple different models.

Figure 5:
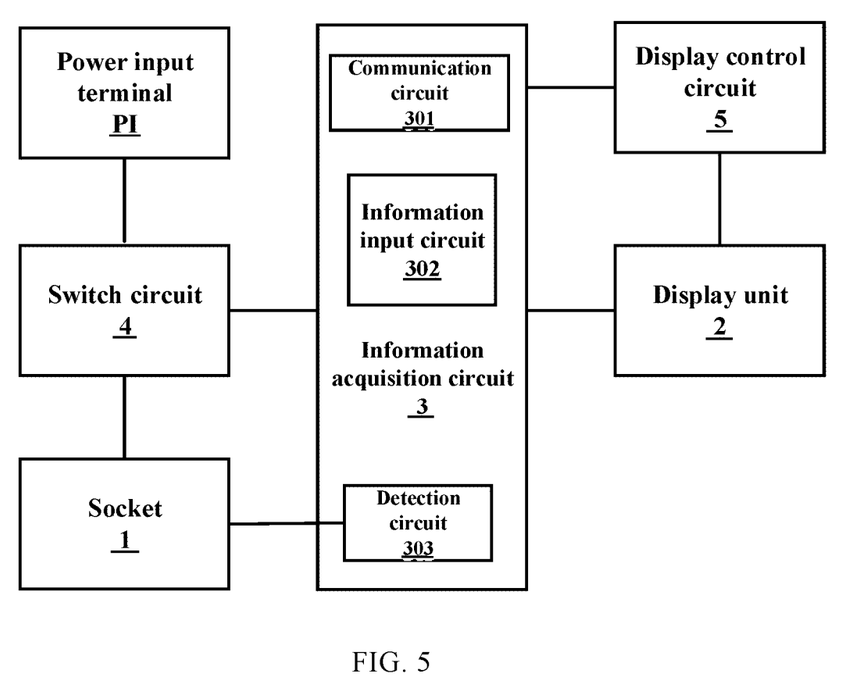
FIG. 5 is a schematic structural block diagram of a power strip according to embodiments of the present disclosure.

FIG. 5 is a schematic structural block diagram of a power strip according to embodiments of the present disclosure.

As shown in FIG. 5, the information acquisition circuit 3 may include a communication circuit 301 configured to communicate with the user terminal, that is, the power strip control device (not shown in FIG. 5) so as to receive information from the user terminal. The communication circuit may include an infrared module, a radio frequency module, a Bluetooth module, a ZigBee module, or a wireless network (e.g., Wi-Fi) module or the like so as to correspond to the communication mode of the power strip control device. The power strip control device may include a remote controller, and/or a portable device (e.g., a smartphone, a tablet, etc.) or the like. As an example, the power strip control device may include a smartphone on which a control program of the power strip 10 is installed. Thereby, the power strip control device can be configured to be able to input and display information of the device plugged into the socket 1.

In embodiments of the present disclosure, in order to make the power strip control device controllably coupled to a power strip, a connection matching controller is further provided on the power strip, and the connection matching controller controls the connection between the power strip control device and the power strip. For example, the connection matching controller can work in an ID-PASS mode, and the power strip control device can only be coupled to the power strip after transmitting the correct identification component and password to the power strip. For example, the connection matching controller can work in an ID-ID mode, and bind the ID of the power strip control device to the ID of the power strip (the ID here can be a system assigned serial number, a number string randomly paired, the code on hardware, etc.). For example, the connection controller can work in a PASS-PASS mode, and configure corresponding encryption algorithms on the power strip and the power strip control device, respectively, and a handshake connection is performed after the key matching authentication is completed.

In embodiments of the present disclosure, the communication circuit 301 can communicate with the power strip control device. The user can conveniently control the power strip 10 through the power strip control device to transmit information of the device plugged into the socket 1 to the power strip 10. In addition, the communication circuit can also return the information of the power strip 10 itself to the power strip control device.

In embodiments of the present disclosure, the so-called communication may be a direct communication, that is, the power strip control device is directly coupled to the power strip, or may be a forwarding communication, that is, the power strip control device and the power strip forward information and instructions of the communication through a remote server of a non-local network.

The information acquisition circuit 3 also includes an information input circuit 302. The information input circuit 302 can be provided in place of the communication circuit 301 or provided at the same time with the communication circuit 301. The information input circuit 302 can include physical buttons. For example, the information input circuit 302 may include array-distributed numeric buttons 0-9 and other function buttons for entering numbers, letters, Chinese, and/or other characters. The information input circuit 302 can also include a touch screen. For example, the information input circuit 302 can be directly provided on the display unit 2, and an input is performed by a touch operation.

In some work sites, wireless network signals cannot reach or wireless networks are not allowed to be started. The user can directly input information of the device coupled to the socket 1 through the information input circuit 302. Further, in the case where both the information input circuit 302 and the communication circuit are provided, the information of the device plugged into the socket 1 can be set in the field, and then the power strip control device reads the information of the device plugged into the socket 1 and the state of the switch circuit 4. This is particularly advantageous in the case where there are a plurality of sockets 1 that need to be uniformly managed in the work site, and this can also prevent the power strip control device from operating the socket 1 incorrectly.

As shown in FIG. 5, the information acquisition circuit 3 further includes a detection circuit 303 configured to detect information of the device.

Figure 6:
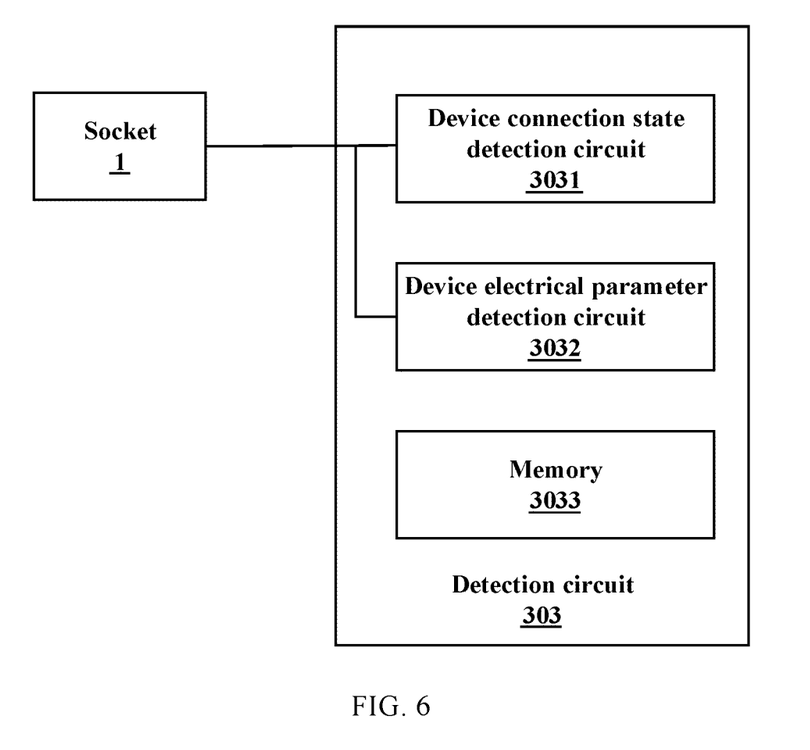
FIG. 6 is a schematic block diagram of a detection circuit shown in FIG. 5.

FIG. 6 is a schematic block diagram of a detection circuit shown in FIG. 5. The detection circuit 303 includes a device connection state detection circuit 3031 configured to detect whether the device is plugged into at least one socket.

The information acquisition circuit 3 is configured to acquire information of the device plugged into the socket 1 in response to detecting that the device is plugged into the socket 1, and causes the display unit 2 to display information of the device. The information acquisition circuit 3 can transmit information "the device is coupled (or plugged into)" to the power strip control device through the communication circuit so as to attempt to acquire information of the device from the power strip control device.

Returning to FIG. 5, the information acquisition circuit 3 can directly transmit the acquired related information to the display unit 2 for display, or can transmit the related information to the display control circuit 5 so that the display control circuit 5 controls the display unit 2 to display. The display control circuit 5 may also be configured to control the display unit 2 to display the connection state of the device, and in response to the device connection state detection circuit 3031 detecting that the device is removed from the at least one socket, control the display unit 2 to stop displaying the information of the device. The display control circuit 5 and the display unit 2 can be integrated together or can be separately provided. Furthermore, the information acquisition circuit 3 can transmit information "device is removed" to the power strip control device through the communication circuit, so that the power strip control device knows the state of the power strip 10.

The device connection state detection circuit 3031 may include any sensor in a mechanical, electronic, or electromechanical form. For example, a piezoelectric sensor can be used, which senses pressure when a plug is plugged into the socket, thereby generating a corresponding electrical signal. According to this electrical signal, the connection state of the device can be known. Further, the device connection state detection circuit 3031 may also include a voltage sensor, a current sensor, or the like to implement the above detection.

As shown in FIG. 6, the detection circuit 303 may further include a device electrical parameter detection circuit 3032 and a memory 3033. The device electrical parameter detection circuit 3032 is configured to detect electrical parameters of the device, and the memory 3033 is configured to store a corresponding relationship between electrical parameters of the device and information of the device. The information acquisition circuit 3 is configured to acquire information of the device from the memory 3033 based on the electrical parameters detected by the detection circuit 303. The device electrical parameter detection circuit 3032 may include at least one of a voltage sensor or a current sensor so as to detect electrical parameters of the device plugged into the socket 1, such as voltage, current, power, and the like. Based on the detected electrical parameters and the corresponding relationship stored in the memory 3033, the information of the device can be acquired more actively and intelligently.

It should be understood that the corresponding relationship between the electrical parameters of the device and the information of the device may also be stored in the power strip control device. At this time, after the detection circuit 303 detects the electrical parameters of the device plugged into the socket 1, the communication circuit 301 transmits the electrical parameters detected by the detection circuit 303 to the power strip control device. The power strip control device obtains the corresponding information of the device according to the electrical parameters sent by the communication circuit and based on the stored corresponding relationship between the electrical parameters of the device and the information of the device, and then sends the information to the power strip 10 for display.

If the detected electrical parameters of the device are not stored in the memory, the information of the device can still be inputted by the user. At this time, the corresponding relationship between the newly acquired electrical parameters and information of the devices may be stored in the memory. The memory can use common storage devices such as MicroSD, SD, CF, HardDisk, SSD, and the like.

In the embodiments of the present disclosure, by providing the detection circuit 303, it is convenient to provide information concerning whether the device is plugged into the socket 1. By setting the memory, the power strip 10 can be enabled to automatically identify the device plugged into the socket 1.

The block diagrams shown in FIGS. 3, 5, and 6 are only used to illustrate the logical relationship between various units and do not have to correspond exactly to the actual physical structures. For example, various circuits in the information acquisition circuit 3, the display control circuit 5, and the like, can be integrated in the same single chip system or implemented respectively by a control structure such as a DSP, an FPGA, or a CPU. It will be understood by those skilled in the art that in order to implement the execution and storage of related instructions, corresponding components for storing executable programs, such as ROM, RAM, and the like, may also be provided, and these storage components and the memory 3033 storing the information of the device may be implemented by the same hardware structure, and may also be implemented separately.

According to the power strip provided by the embodiments of the present disclosure, the user can clearly know the information of the device plugged into the socket 1, and can conveniently remove the correct device. In the process of removing the device, other power cables will not be affected. This can better ensure the safety of both equipment and users. The power strip can be widely used in various places, especially for Internet of Things systems.

It can be appreciated that the above embodiments are merely exemplary embodiments employed to explain the principles of the present disclosure, but the present disclosure is not limited thereto. Various modifications and improvements can be made by those of ordinary skill in the art without departing from the spirit and scope of the disclosure, and such modifications and improvements are also considered as the scope of protection of the present disclosure.

What is claimed is:

1. A power strip comprising:
at least one socket;
a display unit configured to display information of a device plugged into the at least one socket; and
an information acquisition circuit coupled to the display unit and configured to acquire information of the device,
wherein the information acquisition circuit comprises an information input circuit configured to input, by a user, information of the device plugged into the at least one socket, wherein the information input circuit comprises at least one of a button or a touch screen, and
wherein the information acquisition circuit further comprises a communication circuit configured to communicate with a user terminal so as to transmit inputted information of the device to the user terminal.

2. The power strip according to claim 1, wherein the information comprises at least one of a type of the device, a specification of the device, a location of the device, or a state of the device.

3. The power strip according to claim 1, wherein the display unit comprises at least one display screen, and wherein the at least one display screen corresponds to the at least one socket.

4. The power strip according to claim 3, wherein the display unit comprises a display screen.

5. The power strip according to claim 1, further comprising at least one identification component configured to identify the at least one socket.

6. The power strip according to claim 5, wherein the at least one identification component identifies the at least one socket using at least one of a color, a text, or a shape.

7. The power strip according to claim 5, wherein the at least one identification component comprises an indicator light.

8. The power strip according to claim 1, wherein the communication circuit is further configured to communicate with the user terminal to acquire information of the device from the user terminal.

9. The power strip according to claim 8, wherein the communication circuit comprises a wireless network communication module.

10. The power strip according to claim 1, further comprising at least one switch circuit configured to control an electrical connection between the at least one socket and a power input terminal of the power strip.

11. The power strip according to claim 10, wherein the at least one switch circuit is configured to be turned on or off under the control of the user terminal.

12. The power strip according to claim 1, wherein the information acquisition circuit comprises a detection circuit configured to detect information of the device.

13. The power strip according to claim 12, wherein the detection circuit comprises a device connection state detection circuit configured to detect whether the device is plugged into the at least one socket.

14. The power strip according to claim 13, wherein the device connection state detection circuit comprises a piezoelectric sensor.

15. The power strip according to claim 13, further comprising a display control circuit configured to control the display unit to display the connection state of the device, and configured to, when the device connection state detection circuit detects that the device is removed from the at least one socket, control the display unit to stop displaying information of the device.

16. The power strip according to claim 12, wherein the detection circuit comprises a device electrical parameter detection circuit and a memory, wherein the device electrical parameter detection circuit is configured to detect an electrical parameter of the device, and wherein the memory is configured to store a corresponding relationship between the electrical parameter of the device and the information of the device.

17. The power strip according to claim 16, wherein the device electrical parameter detection circuit comprises at least one of a voltage sensor or a current sensor.

\* \* \* \* \*